July 26, 1966 L. A. SHANAFELT ET AL 3,263,028
SWITCHING CIRCUIT FOR DISPLAY DEVICE
Filed Aug. 6, 1962 7 Sheets-Sheet 1

INVENTORS
LEO A. SHANAFELT
QUENTIN H. JOY
BY
ATTYS.

July 26, 1966     L. A. SHANAFELT ET AL     3,263,028
SWITCHING CIRCUIT FOR DISPLAY DEVICE
Filed Aug. 6, 1962     7 Sheets-Sheet 4

FIG. 5

INVENTORS
LEO A. SHANAFELT
QUENTIN H. JOY
BY Brown Jackson Boettcher & Dienner
ATTYS.

FIG. 8a — REF. SYNC. AT NODE a (16KC)

FIG. 8b — BISTABLE MV WAVEFORM AT NODE e (COLLECTOR)

FIG. 8c — VARIABLE SYNC. AT NODE c (UNIJUNCTION) (B2)

FIG. 8d — TIMING WAVEFORM AT NODE d (UNIJUNCTION EMITTER)

FIG. 8e — DIFFERENTIATED MV WAVEFORM AT NODE f

FIG. 8f — VARIABLE DELAY PULSE AT NODE g

United States Patent Office

3,263,028
Patented July 26, 1966

3,263,028
SWITCHING CIRCUIT FOR DISPLAY DEVICE
Leo A. Shanafelt, Los Altos Hills, and Quentin H. Joy, Palo Alto, Calif., assignors, by mesne assignments, to Kaiser Aerospace & Electronics Corporation, Oakland, Calif., a corporation of Nevada
Filed Aug. 6, 1962, Ser. No. 214,886
23 Claims. (Cl. 178—7.3)

It is an object of the present invention to provide a novel switching circuit for a display device, and more specifically to provide a novel switching method and apparatus for providing separate and independent excitation of minute areas of a two-dimensional solid state matrix or continuum.

There is and has been a definite need for a device which is operative as a transducer to convert an electrical input to an optical output primarily adapted for visual observation. In recent years considerable effort and expense have been spent in the advancement and development of many different types of display media including the solid state, liquid, gas, evacuated, mecanical and other types of structures. A comprehensive review of the state of the display art was published in the IRE proceedings, volume 48, pages 1380–1394 (August 1960), and such review includes an extensive bibliography of the different forms of solid state panel devices which have been and are being considered.

One of the more promising arrangements which has been the subject of an active program of development comprises an electroluminescent cell which is made of a thin layer of an electroluminescent phosphor (such as zinc oxide, cadmium oxide, zinc sulphide, etc., several mils in thickness) disposed between and in sandwiched relation with the two sets of parallel conductors, each set being comprised of a plurality of conductors, and the set of parallel conductors on one side of the phosphor being oriented at right angles to the set of conductors on the opposite side of the phosphor. The conductor members of the two perpendicularly oriented grid sets on either side of the phosphor thus establish a matrix comprised of a number of cross-over points which have a phosphor segment disposed therebetween. Switching means are provided to establish a potential difference between a conductor in one of the grid sets, and a conductor in the other of the grid sets, whereby the phosphor disposed at the point of cross-over of the two grids will be excited to illuminate the phosphor cross-over point. The illuminated crosspoint is observed on at least one surface of the display device.

For useful purposes, a panel device of such type requires at least (a) switching means capable of effecting an excitation which is sufficient to produce an acceptable level of brightness, (b) switching means which control excitation at a point, and only at a point, (c) switching means which permits selection of the different points at a rate consistent with displays to be provided in test equipment and other forms of display devices.

The provision of switching means which are so operative has been difficult heretofore by reason of the extremely large capacitive loads of the cross-grid display panel, and the large power requirement required whenever an attempt was made to provide a display of adequate brightness on the high capacitive load at a frequency of a relatively high value.

It is a primary object of the invention, therefore, to provide a novel switching arrangement which is operative to energize a solid state display panel to provide a visual display of data representative signals, which switching means is of a more simple construction, which has reduced power requirements, which is capable of reliably exciting extremely small, minute areas of the phosphor independently of other areas, and which is capable of selecting the minute areas of the display at relatively high frequencies.

In one basic embodiment, the display arrangement includes a switching arrangement including a delay line for each of the two mutually orthogonal grid or conductor sets located on either side of the phosphor layer, one of which sets which will be referred to hereinafter as a horizontal grid set and the other of which is referred to as a vertical grid set. The terms horizontal and vertical are, of course, not intended to be limiting as to the actual physical construction or mounting of the unit.

Each of the delay lines has a number of taps located at successive increments along its length, each of which is arranged for connection to an associated grid in its associated set. A novel pulse generator is provided for each delay line, each of which is operative to generate pairs of pulses for coupling to its associated delay or transmission line. The pulses of each pair are caused to travel along the line and to intersect at a selected interval along the line to establish a coincident pulse thereat, the resultant pulse at the point of coincidence being of an amplitude which is substantially larger in value than the amplitude of the individual pulses in the pair, whereby only the grid connected to the delay line adjacent the point of coincidence is energized. In one embodiment, a pulse generator for a delay line is connected to couple the two pulses of a pair to opposite ends of its associated delay line, a variation in the time of coupling of the pulses to the line effecting variation in the point of coincidence on the delay line, and energization of correspondingly different conductors. Alternatively, the pulses of a pair may be coupled to the same end of a delay line which is of the reflecting type, the second pulse being timed to meet the reflected pulse at the point on the line at which coincidence is to occur.

The generators for the two different delay lines are further timed relative to each other. That is, each crosspoint in the matrix is defined by a horizontal and vertical grid which are connected to corresponding taps along the delay lines for the horizontal and vertical sets. Energization of the phosphor located at the cross-point of a horizontal and vertical grid is effected by coupling two pulses to the horizontal delay line to effect coincidence at the horizontal grid for the crosspoint, and applying two coincident pulses to the delay line for the vertical set to effect coincidence of the pulses at the vertical grid for the crosspoint simultaneously with coincidence of the pulses on the horizontal delay line. Thus four pulses must coincide simultaneously to excite any crosspoint on the matrix.

With proper selection of the values of the pulses and the phosphor excitation level (or with the assistance of suitable biasing means) the portions of the phosphor adjacent the conductors energized by the pulses in their travel along the line will not be illuminated, and only the phosphor at the crosspoint of the two grids or conductors which are excited by the four coincident pulses will be illuminated. The amplitude of the pulses provided by the signal genertors may be modulated to provide different degrees of brightness.

Since coincidence of four pulses is required to select any crosspoint on the matrix (and the pulses must travel along the lines for different time periods depending upon the location of the conductors on the delay lines for the crosspoints on the matrix), it is a further object of the present invention to provide a novel synchronizing arrangement which controls the occurrence of the coincident pulses on each of the delay lines at the desired taps at precisely the same time.

It is a further object of the present invention to provide a system in which the pulse generators are operative to effect coincidence of the pulses on the delay line at a desired point with a minimum of synchronization circuits. According to the invention, the equipment is initially adjusted so that with the receipt of a sync pulse and a position voltage indicating the middle grid on the delay line is to be selected, each of the pulse generators are initially connected to generate pulses which meet at the center tap of its associated delay line a predetermined time interval $tc$ after receipt of a timing or sync pulse to provide a coincident pulse which effects excitation of the center grid. When the pulses coincide in the middle of the line in such manner, the time interval $tc$ after synchronization at which coincidence occurs on the line is made up of the time of travel of the pulse on the line ($tl$) to the point of coincidence plus a given time delay period ($td$) after sync. Thus $tc=tl+td$, and as shown hereinafter, $td$ is adjusted for the pulses of each pair so that the time of coincidence $tc$ is the same predetermined value for coincidence of two pulses at any point on the delay line. Manifestly, if a pulse is to coincide at a point to the left of the center point, the pulse applied to the left hand end of the line will have a shorter period of line travel, and the time delay period $td$ for such pulse must be increased to effect coincidence at the given predetermined time $tc$ after sync. Similarly the pulse of the same pair which is applied to the right hand end of the delay line must travel a longer period on the line ($tl$) and the delay time $td$ for such pulse must be reduced to effect coincidence at the same predetermined time $tc$ after sync.

Stated in another manner, any other point on each line other than the center point is selected by varying the delay time of the pulses for such point from the delay time which is provided for the two pulses which are coincident at the center conductor. Such variation is effected by adding a given time delay to the delay time for one of the pulses and subtracting the same time delay from delay time of the other pulses. By adjusting the time of generation for both pulses of the pair on each of the delay lines, the four pulses which select any point on the matrix will always coincide the predetermined time $tc$ subsequent to the triggering or sync signal.

While such arrangement is set forth hereinafter in its use with a crossed grid display panel, it will be apparent that the novel teachings of the present disclosure may also be used with a continuous panel-type arrangement such as set forth in copending applications having Serial No. 528,222, filed August 13, 1955; Serial No. 544,919, filed November 4, 1955; Serial No. 574,192, filed March 27, 1956; and serial No. 834,045, filed August 17, 1959, the vertical and crossed grid arrangements shown in U.S. Patent 2,955,231 and the selection circuits shown in U.S. Patent 3,105,197, which are assigned to the assignee of this invention.

A further feature of the invention is the manner in which the capacitance of the display panel is made a part of the switching circuit, it being a principal postulate of such method to provide an arrangement in which the panel and its associated circuitry may be viewed as integral parts of an inherently broadband transmission line that is by nature more suitably adapted to the transmission of energy. Such transmission line comprises both inductive and capacitive elements with each grid in the display panel contributing to the capacitive elements. As shown hereinafter, the delay lines of the present arrangement comprise a delay line which exhibits a large bandwidth, low attenuation, and high characteristic impedance.

These and other objects of the invention will be apparent from the following description and accompanying drawings which serve to illustrate the various exemplary embodiments thereof in which.

GENERAL DESCRIPTION OF DISPLAY DEVICE

Figure 1:
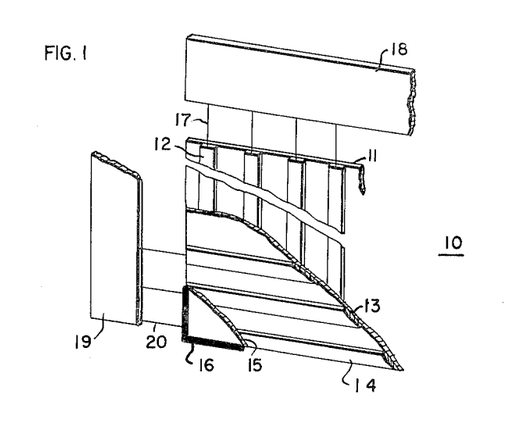
FIGURE 1 is a schematic, sectional illustration of a cross-grid electroluminescent panel including a delay line arrangement for use in selectively energizing different points on the panel.
Figure 2:
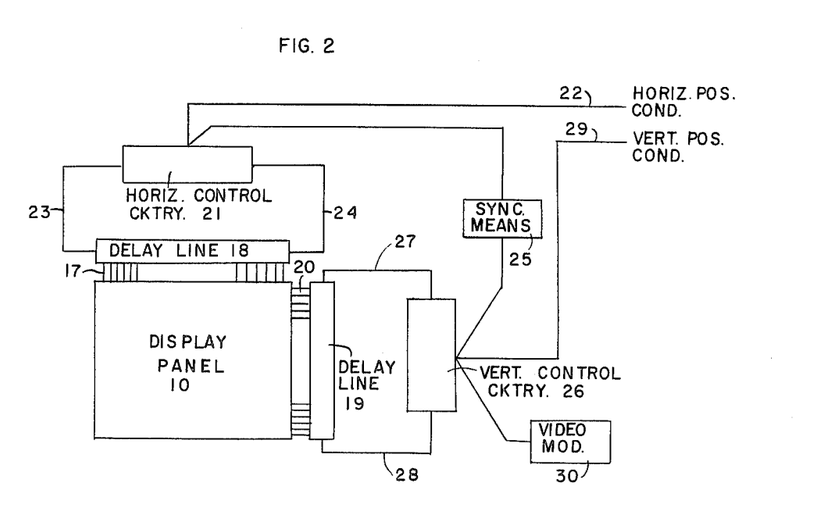
FIGURE 2 is a block diagram of the switching equipment utilizing the novel switching techniques of the invention in the selective energization of points on the electroluminescent cross-grid panel of FIGURE 1.

With reference to FIGURES 1 and 2, the novel display system including a display device 10 and its associated switching circuit is schematically shown thereat. As shown in FIGURE 1, the electroluminescent panel 10 may be a cross-grid panel of any type of a number of well known arrangements, such as shown in Livingston Patent 2,774,813, Peek Patent 2,818,531, and others. In the present embodiment a support member 11, which may be of glass, has a plurality of transparent vertical conductor strips 12 deposited thereon, which may be prepared from such materials as tin oxide, stannic chloride and titanium dioxide, using deposit techniques well known in the art. A film of electroluminescent phosphor 13 is deposited over the vertical strips, and may comprise a crystalline film, or a dielectric suspension of phosphor particles or any other well known form of phosphor screen. In certain embodiments, a thin insulator or dielectric layer is applied over the phosphor layer.

A set of horizontal conductor strips 14 is deposited over the phosphor layer (and dielectric layer if included) which strips may be similar to the vertical conductor strip 12. If desired, rectifier areas (not shown) may be located between the horizontal conductor strips 14 and the phosphor layer. A glass member (or plastic spray) 15 may be used as a cover plate for the structure, and suitable light containing members 16 may be located along the edges to minimize the introduction of light through the glass edges into the display area.

As shown in FIGURE 1, conductor members 20 connected to the ends of the horizontal conductors 14 extend beyond one marginal edge of the display device for connection to individual taps on delay line 19, which may be a flat plate delay line, a toroid-capacitor delay line, or any of a number of well known types of lines which are readily adaptable to tapping at successive intervals along its length, and which has transmission characteristics related to the pulse transmission rates required for the displays to be provided. If a strip delay line is used, such as for example, a bar of barium titanate, the conductors 20 are made of an extremely thin physical structure and may be extended between the horizontal conductors 14 and the taps on the delay line 19 to improve the resolution capabilities of the system by reducing the segment on the line 19 contacted by the conductors 20 and thereby the segment which is responsive to a coincident pulse on the delay line 19.

A delay line 18, similar to delay line 19, has a plurality of taps disposed at successive increments thereon, and conductors 17 couple successive ones of the vertical conductors 12 to successive ones of the taps on delay line 18.

With reference to FIGURE 2, the switching arrangement for the display device of FIGURE 1 is schematically illustrated thereat. A horizontal position input lead 22 couples voltages to horizontal control equipment 21 which are representative of the horizontal coordinates of the data to be displayed, and two output circuits 23, 24 are connected from the control equipment 21 to the opposite ends of the horizontal delay line 18. As shown hereinafter, a horizontal control circuit 21 couples a first signal of a pair over output conductors 23 and a second signal of the same pair over conductor 24, the time of generation and coupling of the output pulses of each pair to opposite ends of the delay line over conductors 23, 24 determining the point of coincidence of the pulse on the delay line, and thereby the one of the conductors 12 selected by the pair of pulses applied to delay line 18.

Alternatively, as shown in one of the arrangements set forth in the U.S. Patent 2,955,231, the switching system may be of the reflective type, in which the two output pulses of each pair of pulses provided by the horizontal control circuit 21 are coupled to the same end of the line. In one reflective arrangement disclosed thereat, the first pulse travels the length of the delay line and is reflected, and the second pulse of each pair is timed to meet the first pulse in its reflected travel along the delay line 18 at the one of the taps to be selected by the resultant coincident pulse.

Vertical control circuitry 26 couples a first pulse of a pair over output conductor 27 to one end of the vertical delay line 19, and a second pulse of the pair over conductor 18 to the other end of delay line 19. A vertical position input circuit 29 couples voltage signals to the vertical control circuitry 26 indicative of the vertical coordinate of the data to be displayed, and vertical control circuitry 26 responsively controls the time of coupling of the pulses of each pair over output conductors 27, 28 to the opposite ends of delay line 19 to thereby effect coincidence of the pulses of the pair at the conductor 20 which passes through the vertical coordinate represented by the vertical position signal.

Sync means 25 are operative to effect relative timing of each pulse of each pair provided by the horizontal and vertical control circuitry 21, 26 for the horizontal and vertical delay line 18, 19, and are further operative to insure that the pulse pair on the horizontal delay line 18, and the pulse pair on the vertical delay line 19 coincide simultaneously with each other at the points on the lines 18, 19 which are connected to the horizontal and vertical conductors for the coordinate point to be energized. As noted above, sync means 25 is operative to control coincidence of the two pulses on delay line 18 and the two pulses on delay line 19 at the same predetermined time interval tc after (or before) a sync pulse.

The brightness of the point selected by the four pulses is determined by the amplitude of the pulses. As shown hereinafter, the horizontal and vertical control circuits 21, 26 provide positive and negative pulses respectively, whereby the four pulses in coincidence result in the application of a potential difference of even larger amplitude across the phosphor 13. Further, video modulation input circuit 30 may be connected to adjust the amplitude of the output pulses of the horizontal and vertical circuitry 21, 26 to different values to thereby modulate the brightness of the display at the selected point to the value indicated by the received signals.

As noted briefly above, a feature of the invention is the manner in which the novel horizontal and vertical control circuitry 21, 26 are operative to effect coincidence of four pulses simultaneously on two different delay lines 18, 19 even though the time of travel of each pulse on the delay line 18 and 19 to select a point may be different. That is, assuming the point on the electroluminescent panel 10 to be selected is two-thirds the distance from the left-hand marginal edge (represented by a tap located at two-thirds the distance from the left-hand marginal edge of the horizontal delay line 18), and is one-fourth the distance from the top marginal edge of the panel 10 (represented by a tap located one-fourth of the distance from the upper end of a vertical delay line 19), it is apparent each of the four pulses coupled to the horizontal and vertical delay lines 18 and 19 to select such point will each have different travel times on the delay lines. However, as noted earlier, it is essential in the operation of the system that each of the four pulses shall arrive simultaneously at the two grids on delay lines 18, 19 which define the desired crosspoint on the panel.

If a pair of pulses are coupled to the opposite ends of a linear delay line at the same time, the pulses will manifestly meet at the middle tap of the delay line. Accordingly as shown in more detail hereinafter the equipment is conventionally adjusted by first effecting coincidence of a pair of pulses at the center of each of the delay lines 18, 19 at a predetermined interval after a sync pulse. That is, the input signal coupled to the horizontal position input conductor 22 is adjusted to the value which controls the circuitry simultaneously to couple two pulses to opposite ends of delay line 18 at a given predetermined period (td) after a sync pulse, whereby the the pulses meet at the center tap at a given period (tc) after sync. The period of delay after sync (td) for each of the two pulses which are generated to meet at the center of the delay line will normally be at least the value of the travel time of a pulse from the end of the line to the middle tap.

In like manner, the signal for selecting the center conductor of horizontal set 14 is applied over vertical position input conductor 29 to the vertical control circuitry 26 to effect the coupling of a first and a second pulse to the opposite ends of delay line 19 at the same predetermined period (td) after sync, whereby the pulses meet in the middle of the delay line 19 at the predetermined period (tc) after sync. Control of the two pairs of pulses to coincide simultaneously at the middle taps of their associated delay lines at the same period tc after sync permits ready adjustment of the circuitry to provide coincidence of a pair of pulses at any point on the line at time (tc) after sync. That is, as shown hereinafter, reciprocal, like variation of the delay times (td) for the pulses of a pair generated to select a tap other than the center tap results in coincidence at any point on the delay line at the same time (tc) after sync. Stated in another manner, considering the delay period for the pulses which meet at the middle as a reference, addition of a given delay time to the reference period for one pulse of the pair, and the subtraction of the same delay period from the reference period for the other pulse will result in the meeting of the two pulses on the line at a correspondingly different tap on the line at the same period (tc) after sync.

The synchronizing and generation of the four pulses by the horizontal and vertical control circuits 21, 26 is controlled by sync pulses received from sync means 25 (horizontal sync 16 kc. p.p.s. and vertical sync 17 kc. p.p.s. in the present embodiment). The horizontal and vertical control circiuts 21, 26 are operative, as noted above, to effect generation of four pulses to select any two conductors 12, 14 which define a crosspoint on the panel 10 at the same predetermined period tc after the receipt of a sync pulse. The importance of such arrangement will be apparent with reference to the more detailed description of the system which is now provided hereat.

GENERAL DESCRIPTION OF SYSTEM

Figure 3:
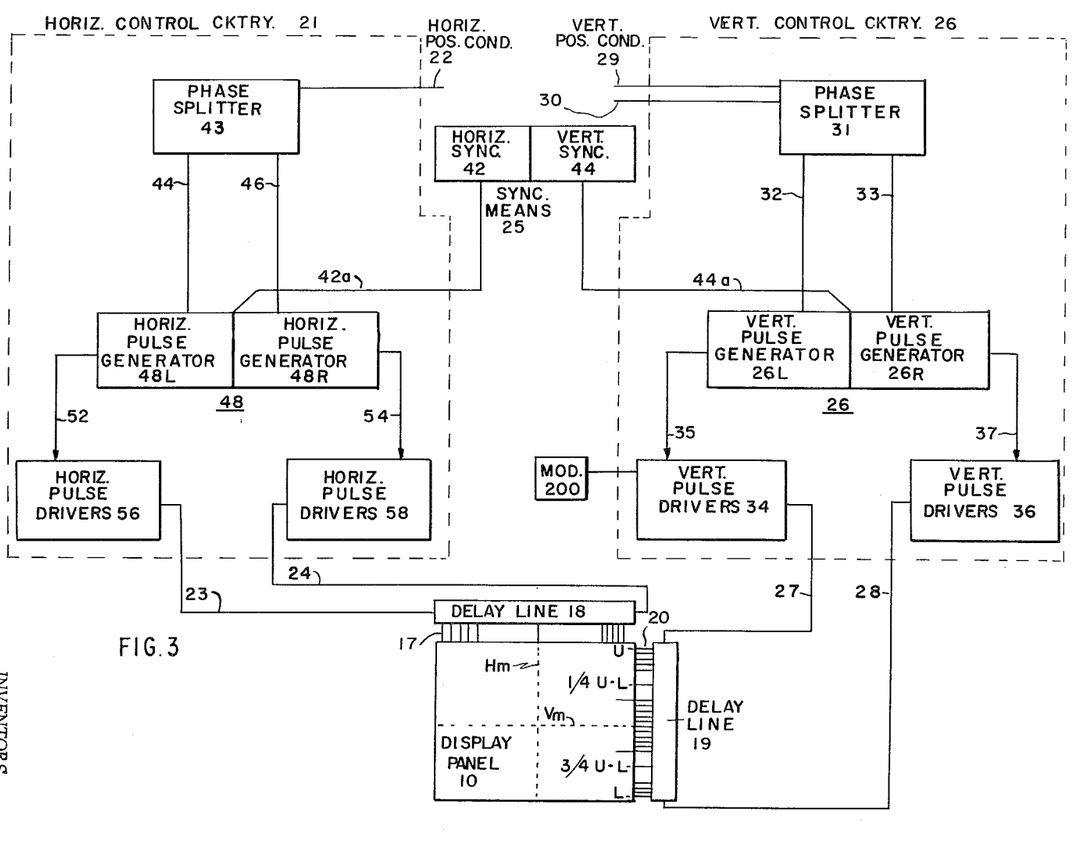
FIGURE 3 is a more detailed diagram of the circuitry of the switching system schematically shown in FIGURE 7.

A schematic diagram of the novel switching arrangement including horizontal and vertical control circuitry 21, 26 for controlling the selective energization of an electroluminescent panel 10 is shown in FIGURE 3. As there shown, the vertical control circuitry 26 includes a phase splitter circuit 31 having a vertical position input circuit 29. Phase splitter circuit 31 generates positive and negative polarity voltages or output signals related in amplitude to the signal received over the vertical position conductor 29, and couples the polarity output signals over conductors 32, 33 to the two input sections of a double pulse generator 26 (26L, 26R, respectively). As shown hereinafter, the more positive amplitude voltage provided by phase splitter 31 is coupled over conductor 32 to the input circuit for the left-hand vertical pulse generator 26L, and the more negative voltages are coupled over conductor 33 to the input circuit for the right-hand vertical pulse generator 26R.

The output pulses provided by vertical pulse generators 26L, 26R are coupled respectively over conductors 35, 37 to a pair of vertical pulse drivers 34, 36 which are operative to amplify and shape the pulse output of vertical pulse generators 26L, 26R, and to couple the shaped pulses over conductors 27, 28 to the opposite ends of the vertical delay line 19. The taps on the vertical delay line 19 are connected over conductors 20 to the horizontal conductors 14 on the display panel 10.

As noted above, as an input signal is coupled to the vertical position input conductor 29 which is of a value to indicate that selection of the middle contuctor $Vm$ of the set 14 is desired, and as the vertical sync pulse is received from vertical sync means 44, the phase splitter 31 provides direct current signals of an amplitude to control pulse generators 26L, 26R to simultaneously generate two pulses of a pair at a predetermined time period ($tdm$) after the receipt of the vertical sync pulse. The two generated pulses are coupled over conductors 35, 37 to pulse drivers 34, 36 and over conductors 27, 28 to opposite ends of delay line 19 to effect the coincidence of the two pulses at the center tap of the delay line 19 at a time ($tc$) after synchronization which is determined by the delay period ($tdm$) which occurs between the sync pulse and generation of the pulse, and the time of travel ($tl$) of the pulse on the line.

With the receipt of a signal of a different value over the vertical position input conductor 29 (as for example, a signal indicating a conductor of set 14 above the center conductor $Vm$), the phase splitter 31 is operative to provide a voltage of decreased amplitude (more negative) over conductor 32 and a voltage of increased amplitude (more positive) over conductor 33.

Vertical pulse generator 26L is operative to generate and apply a pulse over vertical pulse driver 34 to the upper end of the delay line 19 after a delay period which is longer than the period ($td$) for the pulses which coincide at the middle of the delay line 19. The time delay period for a conductor above the middle conductor $Vm$ may be expressed as $tdm+xn$, where $tdm$ is the time delay which occurs between the time of the sync pulse and the time of coupling of the pulses of a pair to the line when the pulses are generated to meet at the middle conduce $Vm$; "$n$" represents the time of travel of the pulses between two adjacent taps on the delay line; and "$x$" represents the number of the taps by which the selected taps are displaced above the center tap $Vm$. The vertical pulse generator 26R is in turn controlled to generate the second pulse of the pair for application to the lower end of delay line 19 at a correspondingly reduced delay period after the sync pulse which may be expressed as $tdm-xn$.

It is apparent that any conductor of the set 14 may be represented in a similar manner, the third conductor above the middle conductor, for example, being selected by vertical generator 26L, 26R with pulses generated at "$tdm+3n$" and "$tdm-3n$" respectively, and the third conductor below the middle conductor would be selected by pulses generated by vertical generator 26L, 26R at "$tdm-3n$," "$tdm+3n$" respectively.

Since the time of coincidence for pulses on both delay lines is determined by adding and subtracting periods of delay to the time delay $tdm$ for pulses which meet in the center of the two delay lines, the coincidence of four pulses to select any crosspoint on the panel will always occur at the same time period $tc$ after the sync pulse.

The horizontal control circuitry 21 is similar to the vertical control circuitry 26 and includes phase splitter circuit 43 (similar to phase splitter 31) which is controlled by signals received over a horizontal position input circuit 22 and its signal output is extended over conductors 44, 46, to pulse generators 48L, 48R respectively. The output circuits of pulse generators 48L, 48R are in turn connected over conductors 52, 54 to horizontal pulse driver circuits 56, 58, the outputs of which are connected over conductors 23, 24 to the opposite ends of horizontal delay line 18. The taps on horizontal delay line 18 are connected over conductors 17 to the vertical conductors 12.

Phase splitter circuit 43 is operative in the manner of phase splitter circuit 31 to provide output signals which vary in an electrical characteristic, such as amplitude, with variation in the value of the signals received over the input conductor 22. The output signals control pulse generators 48L, 48R in the generation of pulses for transmission to pulse drivers 56, 58 for amplification and transmission over conductors 23, 24 to delay line 18 to select the points on delay line 18 indicated by the received horizontal input signals, the selection being effected at any position on the line at the same period of time ($tc$) after the occurrence of the sync pulse. The two pulses are timed to occur at the center conductor on the horizontal delay line 18 at the same time ($tc$) that pulses coincide at the center conductor on vertical delay line 19, and the coincidence of pulses at any other point on the line is controlled to occur at the same time ($tc$) after the sync pulse.

In the embodiment disclosed herein, the horizontal and vertical control circuits 21, 26 provide pulses in the order of one microsecond in a ten megacycle bandwidth on the delay line, and coincidence of the pulses at any point on the lines 18, 19 was effected at $tc=63$ $\mu$s. after sync. In more complex versions, the pulse generators provide pulses in the order of .003 microsecond, and the bandwidths of the delay line are in the order of 124 megacycles at adequate power levels to permit the use thereof in the display of television broadcast transmission.

GENERAL DESCRIPTION OF PHASE SPLITTER
CIRCUIT 31

Figure 4:
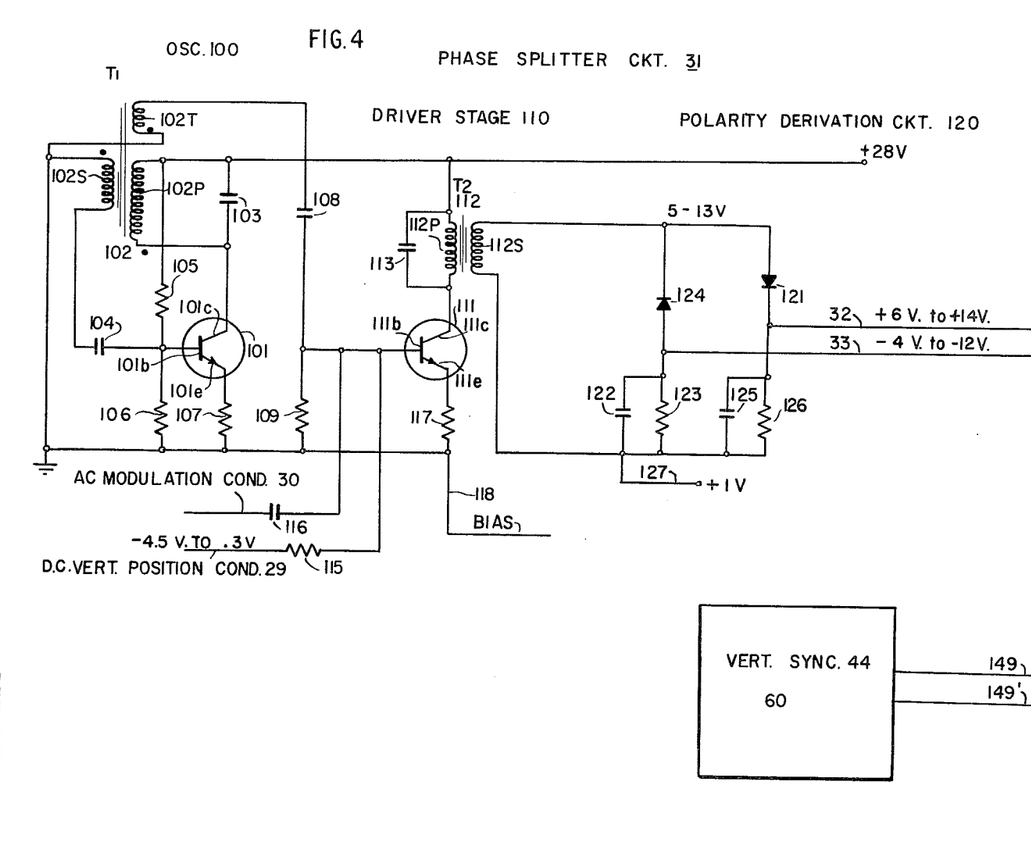
FIGURES 4–7 set forth in detail the specific circuits for controlling selection of any of the many crosspoints on the electroluminescent panel of FIGURES 1–3.

With reference to FIGURE 4, the phase splitter circuit 31 for the vertical control circuitry 26 is shown therein in more detail. As there shown, the input signals which represent the vertical coordinate of the crosspoint to be energized are coupled over vertical position conductor 29 to the input circuit of the phase splitter circuit 31, and alternating current input modulation signals for providing different traces on the display area may be coupled thereto over input conductor 30. Output circuits 32, 33 for the phase splitter circuit 31 are connected to pulse generators 26L, 26R respectively.

Phase splitter circuit 31 is operative in response to the application of vertical positioning signals to conductor 29 to provide output signals over conductors 32 and 33 respectively, which are simultaneously variable in amplitude relative to each other to provide indications of different coordinate positions. In the illustrated embodiment, with the receipt of signals over conductor 29 which vary between $-4.5$ volts to $-0.3$ volt, output signals in the order of 5 to 13 volts were provided by the driver stage 110 and with a bias of $+1$ volt applied to conductor 127, the signals extended over conductor 32 to the vertical pulse generator 26L varied approximately between $+6$ and $+14$ volts and the output signals over conductor 33 to vertical pulse generator 26R varied approximately between $-4$ volts and $-12$ volts.

Phase splitter circuit 31 is also operative responsive to the coupling of alternating current modulation signals over conductors 30 to provide modulated wave shapes over the output conductors 32, 33, the shape of the wave varying with the nature of the alternating current signal applied over conductor 30'.

SPECIFIC DESCRIPTION OF PHASE SPLITTER
CIRCUIT 31

As shown in FIGURE 4, the phase splitter 31 basically comprises a free-running oscillator circuit 100, a driver stage 110, a polarity derivation circuit 120, output conductors 32, 33, and input circuits connected to vertical position conductor 29 and alternating current modulation circuit 30.

The oscillator circuit 100 in the illustrated embodiment is connected to operate at approximately one megacycle, and basically comprises a transistor 101, which may be of the type commercially available as a 2N332 having base, collector and emitter elements 101b, c and e respectively. The collector element 101c is connected over a tuned circuit to a source of positive potential (+28 v.), the tuned circuit including primary winding 102p of transformer 102 and parallel connected capacitor 103. A feedback circuit for transistor 101 includes a secondary winding 102s on transformer 102 and a capacitor 104 connected to the base element 101b of the transistor 101. Base element 101b is biassed by a voltage divider including resistors 105, 106 connected between +28 volts and ground, and emitter element 101e is connected over resistor 107 to ground.

The output of the oscillator circuit 100 is coupled over secondary winding 102T on transformer 102 and coupling capacitor 108 to the input circuit for driver stage 110.

Driver stage 110 includes transistor member 111, which may be of the type commercially available as a 2N338, having emitter, base and collector elements 111e, b, and c, respectively, the transistor 111 being connected as a driver amplifier and gate for the output signals of the oscillator 100, the amplitude of the signal gated by the transistor 111 being determined by the value of the vertical positioning signals which are coupled over vertical position conductors 29 or 30 to the base 111b of the transistor 111.

More specifically, the collector element 111c of transistor 111 is connected to the 28 volt B+ source over a parallel circuit which is tuned to match the driver stage to the oscillator output frequency and which includes capacitor 113 and the primary winding 112p of coupling transformer 112, base element 111b is connected over resistor 109 to ground, and also to the output of oscillator circuit 100, and the emitter element 111e is connected over resistor 117 to bias conductor 118 (or ground). Vertical position conductor 29 is connected over resistor 115 to base 111b, and alternating current modulation signal conductor 30 is connected over capacitor 116 to transistor base 111b.

As indicated above, the oscillator circuit is free running at approximately one megacycle, and the amplitude of the pulses extended over the driver stage 110 will be determined by the value of the control signal which is coupled over vertical position conductor 29 to the base element 111b of the driver stage 110. In the illustrated embodiment the signals applied over conductor 29 to effect selection of different vertical coordinates extending from the upper marginal edge of the panel 10 to the lower marginal edge, varied from −4.5 volts to −0.3 volt. With −4.5 volts at the base 11b of transistor 111, approximately 5 volts appears in the output circuit of driver stage 110, and with −0.3 volt the signal output of the driver stage is increased to approximately 13 volts.

The output signals of the driver stage 110 are coupled over the secondary winding 112s of transformer 112 to a polarity derivation circuit 120 including rectifiers 121, 124 which are connected "back-to-back" and to the output conductors 32 and 33 respectively. A filter circuit comprising capacitor 122 and resistor 123 is connected between conductor 33 and bias source 127, and a filter circuit comprising capacitor 125 and resistor 126 is connected between conductor 32 and bias source 127. Bias source 127 provides a suitable means for adjusting the range of the output signals which are transmitted over output circuits 32 and 33 to values which are consistent with the ranges of operation of the pulse generator circuits 26L, 26R, which may vary as the result of the non-linearity of certain components used therein.

As noted above, and in Table I below, the oscillator 100 and driver 110 are operative to provide output signals which vary between approximately 5 and 13 volts responsive to the receipt of pulses over vertical position conductor 29 which vary between −4.5 volts and −0.3 volt. With the application of a minus one volt bias over conductor 127, and the receipt of signals which vary from −4.5 to −0.3 volt over vertical position conductor 29, the output signals occurring on conductor 32 vary from approximately +6 volts and +14 volts and the signal output on conductor 33 varies approximately from −4 volts to −12 volts.

*Table I*

| Delay Line 18 | Input on C22 | V on C44 | V on C46 |
|---|---|---|---|
| Left Tap L | −4.5 v. | +6 v. | −4 v. |
| ¼ Distance From L to R | −3.2 v. | +8 v. | −6 v. |
| ½ Distance From L to R | −2.0 v. | +10 v. | −8 v. |
| ¾ Distance From L to R | −1.5 v. | +12 v. | −10 v. |
| Right Tap R | −0.3 v. | +14 v. | −12 v. |

| Delay Line 19 | Input on C29 | V on C32 | V on C33 |
|---|---|---|---|
| Upper Tap U | −4.5 v. | +6 v. | −4 v. |
| ¼ Distance From U to L | −3.2 v. | +8 v. | −6 v. |
| ½ Distance From U to L (Middle Tap Vm) | −2.0 v. | +10 v. | −8 v. |
| ¾ Distance From U to L | −1.5 v. | +12 v. | −10 v. |
| Lower Tap L | −0.3 v. | +14 v. | −12 v. |

As shown in the table, the amplitude and the potential of the output signals which appear simultaneously on conductors 32, 33 of phase splitter 31 thus represent the location of the point on the delay line 19 to be selected. As shown in Table I, a signal of −2.0 volts represents the middle range of the input signals on vertical position conductor 29 (nonlinearity in transistor 111 is responsible for slight variation from calculated midpoint), and the vertical control circuit 26 is adjusted responsive to receipt of such signal to select the center conductor Vm of the vertical conductor set 20 on delay line 19. The output signal on conductor 32 in selecting such point will be +10 volts and the output signal on conductor 33 for such point will be −8 volts. The nature of the output signals for selecting other positions on the vertical and horizontal delay lines will be apparent from such table. It will also be apparent from the table that application of signals to horizontal position conductor 22 will control phase splitter 43 in the horizontal control circuitry 21 to provide output signals over conductors 44, 46 to control horizontal generators 48L, 48R in the generation of pulses which effect selective transmission of the different taps on delay line 18.

VERTICAL AND HORIZONTAL PULSE GENERATOR CIRCUITS 26L, 26R AND 48L, 48R

As indicated above, the phase splitters, such as 31, 43, are operative to continually provide signals over conductors 32, 33 and 44', 46 to vertical and horizontal pulse generator circuits 26L, 26R, 48L, 48R of an amplitude and polarity which indicate the horizontal and vertical position of the crosspoint to be selected on the electroluminescent panel 10.

The manner in which each of the vertical pulse generators 26L, 26R are operative in response to such signals to generate pulses for application to the opposite ends of the vertical delay line 19 is now set forth in detail, it being noted that the horizontal pulse generators 48L, 48R are operative in a similar manner to provide pulses for selecting the different taps on the horizontal delay line 18.

It will be recalled that a signal is first provided to the vertical pulse generators 26L, 26R which represents the middle tap on the vertical delay line 19, and as now shown, the vertical pulse generators 26L, 26R are adjusted in response to the receipt of a sync signal from sync circuit 44 to provide two output pulses which are timed to coincide at the middle tap Vm on the vertical delay line 19 which is connected to the middle conductor in horizontal set 14 at a predetermined time period ($tc$) after sync. The coincidence of the pulses at the middle point on the delay line 19 occurs at $td+tl$ after sync (time of delay $td$+time of travel on the line $tl$), in which $td$ for coincidence at the middle of the line is expressed hereafter as $tdm$.

The delay time $td$ for a pulse generated for coincidence at a tap above the midtap of the delay line by generator 26L is expressed as $tdm+xn$ in which $tdm$ is the delay time for coincidence at the midpoint, and $x$ is the number of the taps that the desired tap is located above the midtap on the line, and "$n$" is the time of travel between two adjacent taps on the line. The delay time $td$ for the second pulse of the same pair applied to the lower end of the line 19 by pulse generator 26R is expressed as $tdm-xn$.

The delay time $td$ for a pulse applied to the upper end of the line by vertical pulse generator 26L which is to coincide at a tap located below the midtap may be expressed as $tdm-xn$ in which $tdm$ is the delay time for coincidence at the midpoint, and $x$ is the number of the tap below the midpoint at which coincidence is to occur and $n$ is the time of travel between two adjacent taps on the line. The delay time for the second pulse of the same pair applied to the lower end of the line 19 by pulse generator 26R is expressed as $tdm+xn$.

It will be apparent that the delay time for each pair of pulses provided at the horizontal pulse generators 48L, 48R may also be expressed by $tdm \pm xn$ in which $tdm$ represents the time of delay for coincidence at the middle, $x$ represents the number of the taps that the desired tap is laterally displaced relative to the middle tap, and $n$ represents the travel time between two adjacent taps. The manner in which such variation in the delay time is accomplished will now be described in detail.

Figure 5:
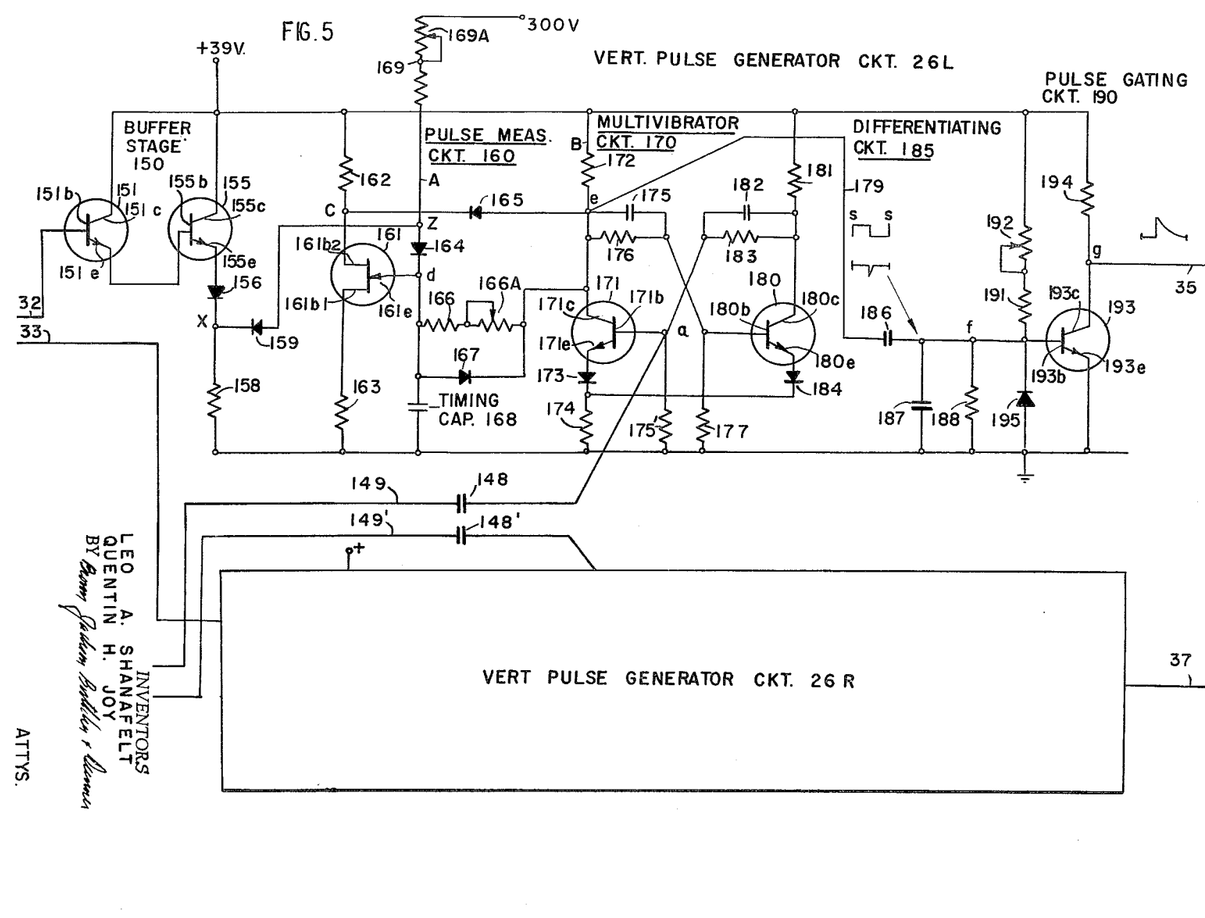

The vertical pulse generator circuits 26L, 26R and the horizontal pulse generator circuits 48L, 48R are substantially identical, and accordingly a detailed disclosure of the vertical pulse generator circuit 26L, as set forth in detail in FIGURE 5, will provide an understanding of the structure and operation of each of the other circuits 26R, 48L, 48R.

Figure 6:
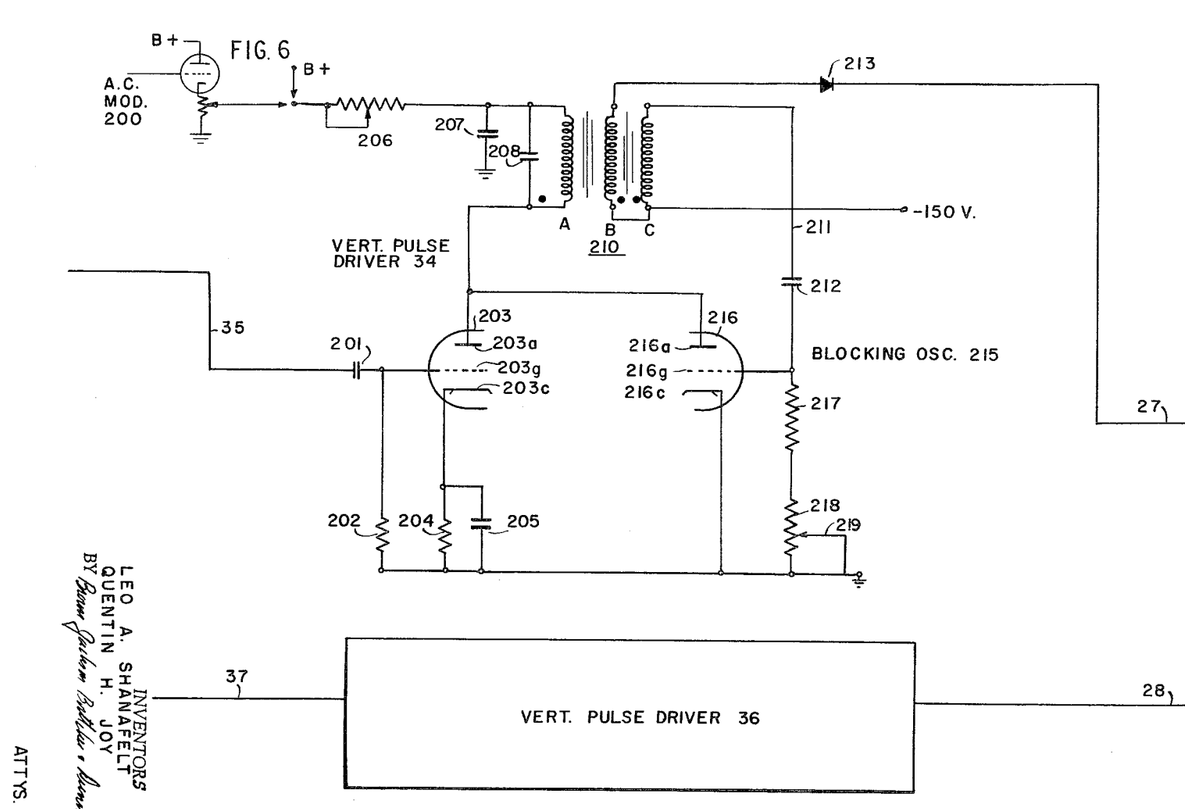

With reference to FIGURE 5, the vertical generator circuit 26L basically comprises input conductor 32 for coupling the polarity output signals of the vertical phase splitter 31 thereto, vertical sync conductor 149 for coupling vertical sync or timer signals from vertical sync means 44 to the generator circuit 26L, buffer stage 150, pulse measuring circuit 160, multivibrator circuit 170, differentiating circuit 185, a trigger or pulse gating circuit 190, and output conductor 35 for coupling the output of the generator circuit 26L to vertical pulse driver 34 (FIGURE 6).

Buffer stage 150 basically comprises a pair of transistors 151, 155 connected in emitter follower configurations for impedance matching purposes, the stage being operative to couple the polarity output signals of the phase splitter 31 to the pulse measuring circuit 160. Transistor 151 includes a collector element 151c connected to B+ supply (+39 volts), base element 151b connected to one output conductor 32 of the phase splitter circuit 31, and emitter element 151e connected to the base circuit for the second transistor 155 in buffer stage 150.

Transistor 155 includes collector element 155c connected to B+ source (+39 volts), base element 155b connected to emitter element 151e of transistor 151, and emitter element 155e connected over diode 156 and resistor 158 to ground. A reference diode 159 is connected between the junction point of diode 156 and resistor 158 (node X) to provide a reference voltage for node Z in the pulse measuring circuit 160. That is, the voltage signals received over conductor 32 from phase splitter 31 appear at node X, and by means of a reference diode 159 identifies the vertical coordinate to be selected to the pulse measuring circuit 160 (i.e., the amplitude of the received signal identifies the location of the vertical coordinate). The pulse measuring circuit 160 is, in turn, operatively controlled by the reference signal to provide a pulse at a time interval $td$ after the occurrence of the sync pulse, which interval $td$ is determined by the value of the signal appearing at nodes X and Z.

More specifically, pulse measuring circuit 160 comprises a unijunction transistor 161 having a base 161$b$2 connected over resistor 162 to B+ source (+39 volts), base 161$b$1 connected over resistor 163 to ground, and a common emitter 161$e$ connected to the reference point Y in a charging circuit for a timing capacitor 168.

Timing capacitor 168 is connected in two charging paths, one of which paths (A) extends from a 300 volt source of potential over resistor 169 including adjustable arm 169a, diode 164, and capacitor 168 to ground, and the other of which paths (B) extends from +39 volts potential source over resistor 172, adjustable resistor 166a, resistor 166, and timing capacitor 158 to ground.

In that the charging circuits are operative with transistor 161 and the multivibrator circuit 170, the operation thereof is disclosed more fully after a more specific description of the multivibrator circuit 170.

Multivibrator circuit 170 includes a first transistor 171 and a second transistor 180 and associated elements which connect the two transistors in a multivibrator circuit configuration. Transistor 171 includes collector 171c connected over resistor 172 to +39 volts potential source which is in turn connected in the second path of the charging circuit for timing capacitor 168, a base element 171b connected over a coupling circuit including capacitor 182 and resistor 183 to the collector 180c of the second transistor 180 in the multivibrator circuit 170 and over bias resistor 175' to ground, and an emitter element 171e connected over diode 173 and common resistor 174 to ground. Collector element 171c of the first transistor 171 is also connected over conductor 179 to differentiating circuit 185, and over coupling circuit including capacitor 175 and resistor 176 to base 180b of the second transistor which is in turn connected over resistance 177 to ground. Collector element 180c is connected over resistor 181 to B+ source (+39 volts) and over the coupling circuit including resistor 183 and capacitor 182 to the base 171b of the first transistor stage in the multivibrator circuit 170. The emitter elements 171e and 180e of transistors 171 and 180 are connected respectively over diodes 173 and 184 and a common resistor 174 to ground.

The vertical sync conductor 149 which extends to the vertical sync means 44 is coupled over capacitor 148 to the base element 171b of the first transistor 171 of the multivibrator circuit 170. As shown in more detail hereinafter, coupling of a vertical sync pulse over conductor 149 and capacitor 148 to the multivibrator circuit 170 controls same in the generation of a square wave pulse, the duration of the generated pulse being determined by the pulse measuring circuit 160, which is in turn operative to measure a time element which is related to the value of the input signal representing the vertical coordinate as received over the vertical input conductor 32 from the phase splitter 31. Each square wave pulse generated by the multivibrator circuit 170 is coupled over conductor 179 to differentiating circuit 185.

Differentiating circuit 185 includes capacitor 186, a parallel connected resistor 188 and capacitor 187, and is operative to differentiate the trailing edge of each positive pulse which is coupled over conductor 179 to the differentiating circuit by the multivibrator circuit 170. The differentiated pulse provided by the differentiating circuit 185 is coupled to a trigger or pulse gating circuit 190.

Trigger circuit 190 comprises a transistor 193 having collector element 193c connected over resistor 194 to +39 volts potential source, a base element 193b connected over a first resistor 191 connected in series with a second resistor having adjustable arm 192 to the +39 volt source, and also over coupling capacitor 186 to receive the output of the differentiating circuit 185, and an emitter element 193e connected to ground. Diode 195 is connected across base and emitter elements 193b, 193e to protect the transistor 193 against the application of excessive negative base-emitter voltage. Adjustable arm 192 on resistor 191 is adjusted to provide a bias to the transistor 193 to effect the optimum degree of saturation. As shown by the waveform appearing adjacent conductor 35, with the receipt of the negative pulse from the differentiating circuit, the transistor 193 is driven off and the rising voltage in the collector circuit of the transistor 193 (which appears on conductor 35) constitutes a pulse which occurs at a time $td$ after the receipt of the sync pulse. A similar timed pulse is provided by vertical pulse generator circuit 26R and as shown hereafter the two pulses are applied to opposite ends of the delay line to effect selection of the vertical coordinate on the panel 10 which is indicated by the signal received over the vertical positioning conductor 29.

OPERATION OF VERTICAL PULSE GENERATOR CIRCUIT 26L IN GENERATION OF A TIMED PULSE FOR SELECTING A POINT ON DELAY LINE 19

It will be recalled that in the initial adjustment of the equipment, vertical pulse generator circuit 26L and vertical pulse driver 34 are controlled to generate and couple a pulse to the upper end of the delay line 19 simultaneously with the coupling of a pulse by the vertical pulse generator 26R and vertical pulse driver 36 to the opposite end of the delay line, whereby the pulses will coincide at the middle tap $Vm$ (FIGURE 3) on the vertical delay line 19. The manner in which such pulses are provided is now described.

With reference to FIGURE 5 in connection with FIGURE 8, it will be apparent that with transmission of a vertical sync signal (in the present embodiment a 16 kc. signal—FIGURE 8a) over conductor 149 and capacitor 148 to the base element 171b of the first transistor 171 in the multivibrator circuit 170, transistor 171 will be biased off, and a positive-going signal occurs in the collector circuit 171c which is transmitted over coupling circuit 175, 176 to the base element 180b of the second transistor 180 to in turn cause the transistor 180 to conduct. Simultaneously, the positive-going voltage is transmitted over conductor 179 to the differentiating circuit 185 (and over diode 195 to ground), which voltage constitutes the leading edge of the positive pulse which is being generated by the multivibrator circuit 170 (FIGURE 8b).

As transistor 171 is biassed off, path B of the charging circuit for timing capacitor 168 is completed, the circuit extending from +39 volts over resistor 172 and the portion of resistor 166A which is connected in the charging circuit, and resistor 166 and capacitor 168 to ground. Resistors 176 and 177 are connected to ground in parallel with charging path B.

In that the two pulses of the pair generated at this time are to meet at the center tap on delay line 19, it is apparent that the input voltages applied over vertical positioning conductor 29 to the vertical control circuitry 26 will (neglecting a certain nonlinearity in the components) be in the approximate middle of the range of signals which are coupled thereover. As shown in Table I, a signal of −2 volts is coupled over conductor 29 to effect coincidence of the pulses in the center of the delay line 19 in the present embodiment, and the resultant output signal on conductor 32 will be ten volts.

Figure 8A:
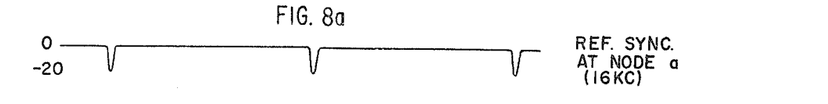
FIGURES 8a–8f illustrate the waveforms which occur at different points in the circuitry of FIGURES 4–7.
Figure 8B:
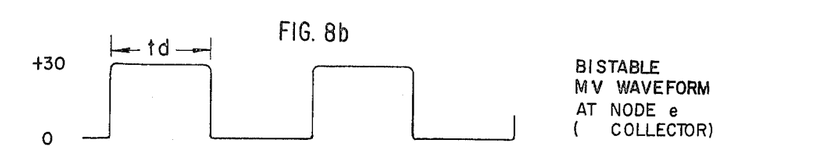
Figure 8C:
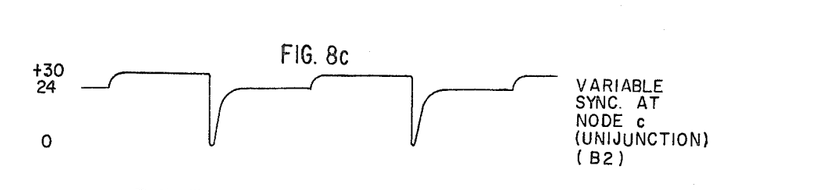
Figure 8D:
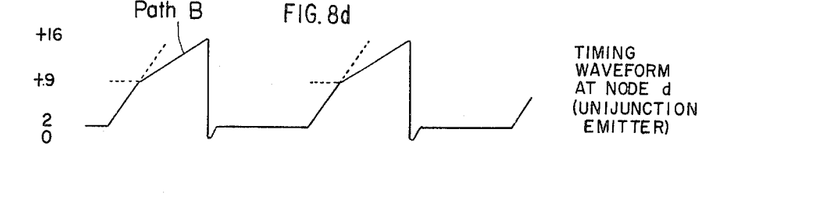

With the application of a ten volt signal to buffer stage 150, a signal in the order of approximately ten volts appears at node X (the buffer stage effecting a slight drop in the value of the signal), and accordingly the first charging circuit A for timing capacitor 168 will be quickly effective to charge capacitor 168 to the voltage at node X (see FIGURE 8d). In that the charging circuit A is connected to a 300 volt source, the capacitor 168 is charged to the value of node X in an extremely short time period and diode 164 turns off relatively quickly, and in effect, the voltage at node Z closely follows the signal which appears on the vertical position input conductor 32.

As noted above, the second charging circuit B is rendered effective as each sync signal is coupled to the multivibrator circuit 170, and the circuit charges condenser 168 at a predetermined rate to raise the value of the potential on capacitor 168 toward approximately 22 volts, the rate of charge being somewhat slower than in the case of charging path A alone or paths A and B together.

As the potential on capacitor 168 reaches such value, transistor 161 conducts over the path extending from +39 volts over resistor 162, base $b2$, emitter E and base $b1$ of unijunction transistor 161 and resistor 163 to ground. The resultant negative-going potential which occurs at node C (FIGURE 8c) as the result of conduction of transistor 161 is transmitted over diode 165 and coupling circuit 175, 176 to the base element 180b of the second transistor 180 in the multivibrator circuit 170 to turn off transistor 180. The positive-going pulse which appears in the collector circuit 180c of transistor 180. The positive-going pulse which appears in the collector circuit 180c of transistor 180 is transmitted over coupling circuit 182, 183 to the base element 171b of the first transistor 171 to turn on transistor 171.

Figure 8E:
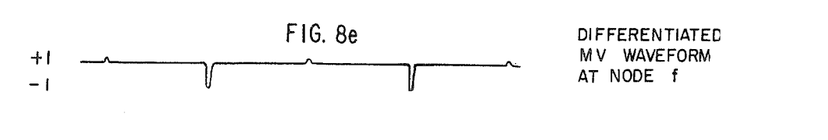
Figure 8F:
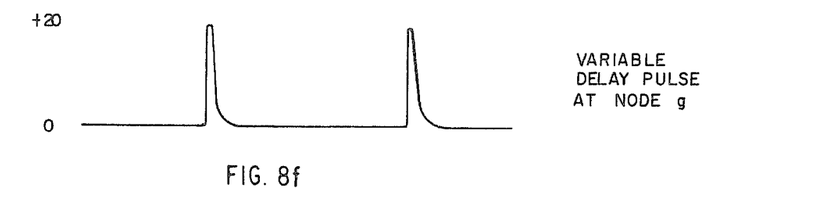

The negative-going pulse which now appears in the collector circuit 171c of transistor 171 constitutes the trailing edge of the positive pulse generated by the multivibrator circuit 170 (FIGURE 8b) and such portion of the pulse as coupled to the differentiating circuit 185 is differentiated (FIGURE 8e) and coupled to the base element 193b of transistor 193 in gating circuit 190 to turn off transistor 193. The positive-going pulse which appears in the collector circuit 193c of transistor 193 is transmitted over conductor 35 to vertical pulse driver 34 for shaping and coupling to the upper end of the delay line 19.

The time of occurrence of the output pulse after sync is thus determined by the length of time that charging circuits A and B are effective, which is in turn determined by value of the reference potential at node Z which represents the value of the signal on input conductor 29 (FIGURE 4). Changing the value of the signal on conductor 29 varies the effective time of charging circuit B, and thereby the delay period $td$ after sync at which the pulse is coupled to the delay line.

As indicated above, the vertical pulse generator circuit 26R is operative simultaneously with pulse generator 26L to generate a second pulse for coupling over the conductor 28 to the lower end of the delay line 19. If the pulses are generated and coupled to the opposite ends of the delay line at like delay times ($td$) subsequent to sync, the two pulses will coincide at the middle tap $Vm$ on delay line 19. The time of coincidence $tc$ at the middle tap $Vm$ is equal to the delay time $td$ after sync plus the travel time on the line $tl$.

With a delay line having a length of 22 μs., the travel time $tl$ on the line to the middle tap $Vm$ is 11 μs. In the disclosed embodiment in which sync pulses are received at a 16 kc. rate, an input signal of −2.0 volts on the vertical position conductor 29 controls phase splitter 31 to couple signals of +10 volts and −8 volts to conductors 32 and 33 respectively, and the vertical pulse generators 26L, 26R are respectively operative to provide output signals having a delay time $td$ of approximately 52 μs. (Vertical pulse generator 26R is identical in structure to vertical pulse generator 26L but is biassed to operate with a different range of input signals, i.e., −4 to —12 volts.) The time of coincidence tc for the two pulses td+tl (52+11) or approximately 63 μs. after the sync pulse is applied to the multivibrator circuits, such as 170, in each of the generator circuits 26L, 26R.

Arm 166a on resistor 166 (FIGURE 5) provides a convenient means for adjusting the pulse output of the generator circuits 26L, 26R to insure coincidence at the middle tap Vm at the desired time interval tc after sync, whereby any nonlinearity in components may be readily compensated. Visual observation of the display panel provides one manner of determining actual coincidence, or alternatively the output of the two generators may be connected to a dual trace oscilloscope, and arm 166 adjusted until coincidence occurs.

As noted above, coincidence of a pair of pulses to effect selection of any tap on the line always occurs at the same predetermined time period (tc) subsequent to the receipt of the sync pulse (63 μs. in the present example).

By way of further example, when the tap ¼ U-L on vertical delay line 19 (the tap one-half the distance between the middle tap and the upper tap) is to be selected, the input signal on vertical position conductor 29 is decreased in value from —2.0 to —3.2 volts (Table I), and the signal coupled by phase splitter 31 to conductor 32 will go more negative (from +10 to +8 volts for example), the signal at node X will be correspondingly smaller (i.e., approximately 8 volts) and capacitor 168 will be charged to approximately 8 volts (a smaller value than in the example in which the middle tap Vm was selected).

As a result, the charging current over path B will require a longer period to charge the capacitor 168 in generator 26L to 22 volts, and the duration of the output pulse of multivibrator 170 in generator 26L will be lengthened by such period. As noted above, such increased period of delay results in the selection of a tap other than the center tap, and in the present example, the tap ¼ U-L.

In the present example, the time of travel from the upper end to the top ¼ U-L is (¼) (22 μs.)=5.5 μs. Since the time of coincidence at the middle tap (and therefore any tap) in the present embodiment is 63 μs., the delay period for the pulse which is generated by generator 26L to coincide at ¼ U-L is 52 μs.+5.5 μs. or 57.5 μs. Such increase in the delay period is provided in the system as the result of the smaller signal (8 volts) at node Z, and the increased time period required by charging path B to charge capacitor 168. The time delay for the pulse generated by generator 26R will be 52 μs.—5.5 μs.=46.5 μs., as shown hereinafter.

The increased delay period in the case of the first pulse may be expresed as "xn" in which n equals the time of travel between two adjacent taps on the delay line and x is the number of taps that the desired tap is displaced from the center tap. For purposes of example, if the delay line 19 has a length of 22 μs. and has forty taps between the ends of the line, each of which is located .55 μs. apart, and the circuity is adjusted so that coincidence occurs at center tap 20 at 63 μs. after sync, the time of travel on the line to the center tap is 11 μs., and the delay time td for pulses which meet at the center tap is 52 μs. The tap ¼ U-L which is the tenth tap from the upper end will be reached by a pulse coupled over conductor 27 to the upper end of delay line 19 after a shorter period of travel on the line, i.e. (.55) (10)=5.5 μs. Accordingly the delay period must be "xn" longer than the delay period for the pulses which meet at the center tap of the line if coincidence is to occur at 63 μs. after sync. Since the increased delay period must be "xn" or (.55) (10)=5.5 μs. longer than the delay time for pulses which meet at the center, the delay time is 52+5.5 μs.=57.5 μs. The pulse therefore arrives at tap ¼ U-1 at tl+td or 5.5 μs.+57.5 μs.=63 μs. after sync.

The second pulse which is generated by the vertical pulse generator 26R must have a correspondingly reduced delay period since it has a further distance to travel before coincidence occurs, i.e., (30 taps) (.55)= 16.5 μs. or 5.5 μs. beyond the center tap. Accordingly phase splitter 31 couples a more positive signal over conductor 33 (from —8 to —6 volts), the signal at node X in the pulse measuring circuit 160 for generator 26R will be at a more positive value, the charging time of the capacitor 168 in pulse generator 26R will be decreased by xn μs. (.55) (10)=5.5 μs., the duration of the output pulse of multivibrator 170 of pulse generator 26R will be shortened by 5.5 μs., and the pulse is coupled oxer conductor 137 by generator 26R, 5.5 μs. sooner than in the case of the pulse transmitted to effect coincidence at the center point on the delay line, i.e., the pulse is applied to the line at 52 μs.—5.5 μs. or 46.5 μs. after sync. Travel time on the line is now 11+5.5= 16.5 μs., and with a delay time of 46.5 μs., the pulse arrives at tap ¼ U-L at 63 μs. after sync.

Summarily, the pulse provided by the vertical pulse generator 26L is coupled to the upper end of the line at tdm+xn or 52 μs.+5.5 μs.=57.5 μs., after sync, and the travel time of the pulse on the line to the tenth tap is 5.5 μs., whereby the pulse arrives at the tap at 63 μs. after sync. Since the other pulse is coupled to the lower end of the line by vertical pulse generator 26R at tdm—xn or 52 μs.—5.5 μs.=46.5 μs. after sync, and the travel time on the line for the pulse from the lower end to tap 10 is 16.5 μs., the second pulse also arrives at tap 10 at 63 μs. after sync. It is seen, therefore that coincidence of the two pulses occurs at tap 10 above the middle tap at the same time after sync (63 μs.) as in the case of coincidence of the pulses at the center tap (63 μs.)

Thus, by using the time period of delay for the two pulses which select the middle tap as a reference, and reciprocally varying the delay time of the two pulses of a pair, a correspondingly different position on the line can be selected, the time of selection always being the same period after sync.

In the foregoing example, the described circuitry effects X–Y scanning of the panel which permits the display of time base waveforms, such as sinusoidal waveforms, Lissajous patterns, and the like. It will be recalled that the waveform to be displayed is coupled over conductor 30' (FIG 4) to amplitude modulate an oscillator driver stage 100, 110 in the pulse splitter circuit 31 to provide a 100% modulated RF voltage which is applied to a polarity derivation detecting circuit 120 for separation into a positive and negative signal which are complementary as to their time base and simultaneously vary in amplitude relative to a given reference and in the opposite direction. The complementary signals are then applied to the two pulse generators, such as 26L, 26R to effect reproduction of the waveform on the panel 10.

It will be apparent from such disclosure that the system is also readily operative to provide a raster scan. In such arrangement, a pair of complementary sawtooth signals are applied to the horizontal positioning conductor 22 and vertical positioning conductor 29, and the coincidence point of the pulses is shifted in accordance with the sawtooth signals to provide automatic raster scan. Since a line must be scanned prior to advance of the vertical scan, the period of the horizontal and vertical sawtooth signals are proportioned in a corresponding manner. Thus, in a panel in which 250 lines are scanned the relative time periods of the horizontal and vertical sawtooths would be 250:1. In one raster scan the complimentary waveforms were identical in their time parameters and were mirror images of each other at every instance with respect to their voltage displacements above and below a reference level. Modulation of the display may be effected by coupling the modulating signals over circuit 200 (FIGURE 6) to effect a corresponding variation in the amplitude of the coincident pulse on at least one of the delay lines.

It has been found that the use of the novel circuitry for providing signals complimentary as to time base and variable in amplitude relative to each other, results in extremely reliable synchronization of the coincident pulses on the two delay lines 18, 19.

VERTICAL PULSE DRIVERS 34, 36

The output pulses of the vertical pulse generator circuits 26L, 26R (FIGURE 5) are coupled over conductors 35, 37 to vertical pulse drivers 34 and 36 (FIGURE 6) respectively. The pulse driver circuits 34, 36 basically comprise a trigger 203 and a blocking oscillator 215 which provide means for adjusting the width of the pulse to the desired size and shape prior to coupling of the pulse to the vertical delay line 19.

More specifically, with reference to FIGURE 6, vertical pulse driver 34 shown thereat basically comprises coupling capacitor 201 connected to the output conductor 35 which couples the output pulses of the vertical pulse generator circuit 26L to one section of a two section tube 203, such as 12BH7A, which has an anode, grid and cathode elements 203a, 203g, 203c, respectively. Anode 203a is connected to a B+ source over a circuit including adjustable resistor 206, primary winding A of transformer 210 parallel-connected with pulse widening capacitor 208; grid element 203g is connected over coupling capacitor 201 to the conductor 35 to receive the incoming pulses from the pulse generator circuit 26L and also over grid resistor 202 to ground; and cathode element 203c is connected over parallel connected resistor 204 and capacitor 205 to ground. Filter capacitor 207 is connected from the junction point of variable resistor 206 and the upper end of primary winding A to ground when alternating current modulation 200 is not used. If alternating current modulation of the pulses is to be effected, such as in an embodiment in which the pulses are controlled to provide a raster sweep and video information is displayed by modulating the sweep, an emitter follower circuit 200 may be connected in the B+ supply for the pulse driver 34, and the modulation signals may be applied to the grid thereof.

Transformer 210 may be of the type commercially available as a PE2225 having a B and C secondary winding. Winding B has one end connected to —150 volts potential, and the other end connected over diode 213 to the output conductor 27 for the pulse driver 34 and the C winding has one end connected to —150 volts potential and the other connected over capacitor 212 to the blocking oscillator circuit 215.

Blocking oscillator 215 is operative to generate pulses which are in the order of 300 volts, and of four microseconds duration, and may comprise the second section 216 of the 12BH7A vacuum tube, including anode 216a connected to transformer winding A with the anode 203a of the first section, grid 216g connected over capacitor 212 to the C winding of transformer 210, and also over resistors 217 and 218 to ground. Resistor 218 has adjustable arm 219 to permit biasing of the blocking oscillator to operate at the approximate frequency of the pulses received over conductor 197.

In operation, as a pulse is coupled to the trigger 203, which is normally biased off, the trigger is driven more conductive to provide a pulse of increased power and amplitude over the anode circuit thereof and the primary winding of transformer 210. An amplified pulse appears in the secondary winding B of transformer 210 which is coupled over the diode 213 to the output conductor 27, which operates as a blocking gate to prevent the pulses applied to the opposite ends of the delay line by pulse driver 36 from entering the blocking oscillator circuit 215. The pulse is also coupled over the feedback winding C to the grid of the blocking oscillator 215 which conducts. Blocking oscillator 215 is also operative to provide an impulse of increased amplitude and power over its output circuit and the primary winding A and provides an increasing signal in the anode circuit 216A until the anode reaches the same potential as the cathode and the transformer winding saturates, at which time the bias signal for grid 216g goes negative, and the blocking oscillator 215 is turned off. The output pulses transmitted over conductor 27 are coupled to the upper end of the vertical delay line 19.

In a similar manner, the output pulses provided by the vertical pulse generator 26R over conductor 37 to the vertical pulse driver 36 control the vertical driver 36 to provide shaped pulses which are transmitted over conductor 2 to the lower end of vertical delay line 19.

DELAY LINE 19

Figure 7:
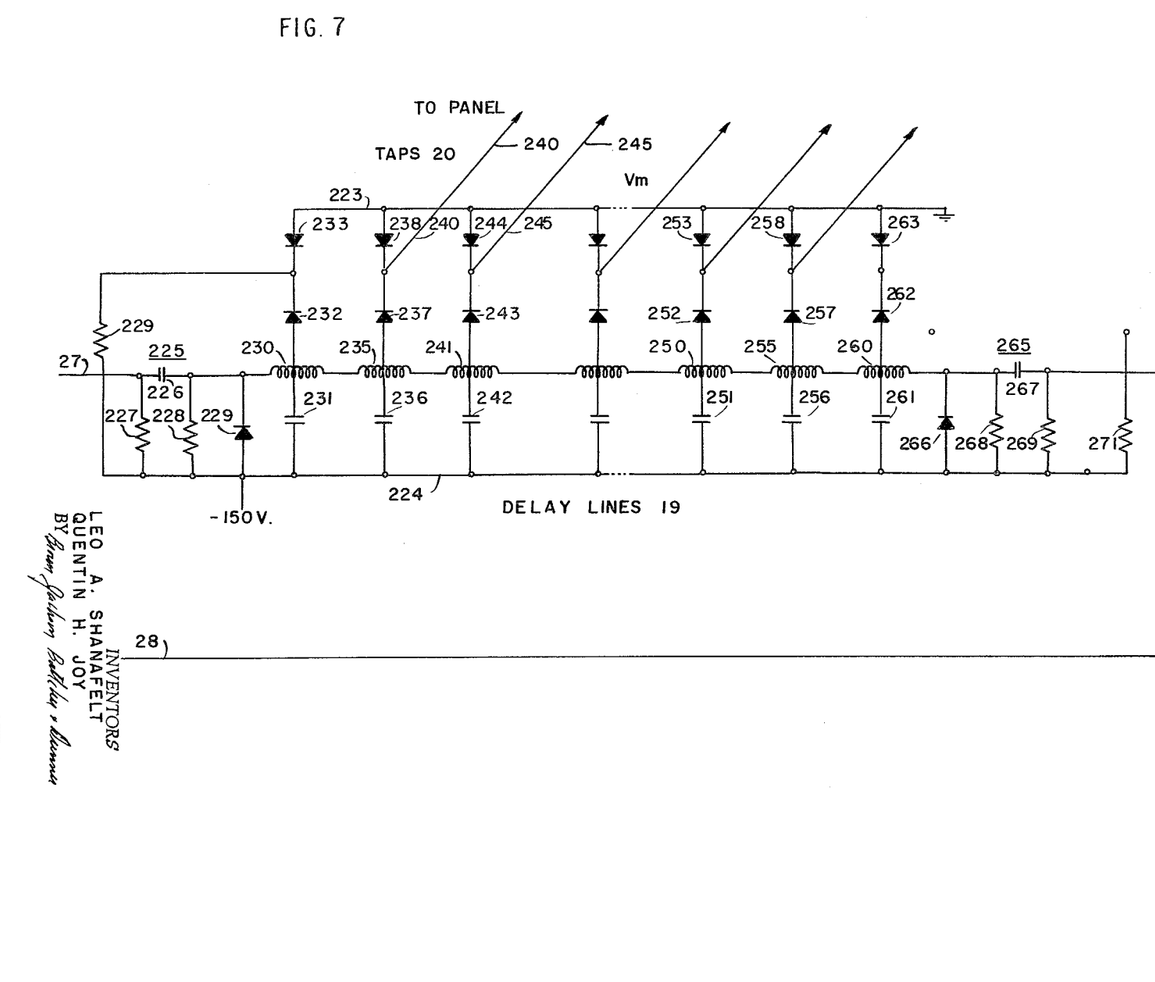

The delay line 19 may be any one of a number of well known types of delay line, one of which is shown in FIGURE 7. As there shown delay line 19 comprises two input circuits 225 and 265 respectively. The left hand input circuit is connected to conductor 27 to receive the output signal from the vertical pulse driver 34, and the input circuit 265 on the opposite end of the delay line 19 is connected to conductor 28 to receive the output pulses of the vertical pulse driver 36. Input circuit 225 includes a coupling circuit comprised of capacitor 226 connected to one end of the delay line and resistors 227, 228 connected on either side thereof to —150 volt source. A diode 229 is connected between the junction of the capacitor 226 and one end of delay line 19 and the —150 volt source. Input circuit 265 is similarly constituted and includes coupling capacitor 267, resistance 268, 269 and diode 266.

The delay line 19 is basically comprised of a plurality of toroid windings, such as 235, each of which should be in the order of 295 millihenries and a capacitor, such as 236, in the order of 47 mmf. connected between the center tap of the toroid 235 and the negative 150 volt source. The center tap of each toroid is also connected over a diode gate, such as 237, to an associated tap 240 of the group 20, each tap of the group 20, as noted herein, being connected to an associated one of the conductors 14 on the electroluminescent panel 10. A second diode, such as 238, may be connected in an oppositely poled manner between the first diode, such as 237, and ground, although in certain embodiments such diode is not required. The toroid coils in one embodiment comprised 67 turns of No. 32 wire from each end of the center tap, (134 turns total), each coil being tuned to the center tap.

A tap, such as 240, is energized by a 290 volt pulse responsive to the coincidence of a pair of pulses on its interconnected toroid coil, such as 235, the diode, such as 237, prevents the single pulses (approximately 150 volts in value) in their travel along the delay line 19 from energizing the taps, such as 240. Stated in another manner, the diodes are biased at 150 volts and a coincident pulse of two pulses (resulting in a potential of approximately 280 volts minus the 150 volts) is required to effect energization of the grid which is connected to the delay line at the point of coincidence.

The phosphor layer B requires a potential of approximately 250 volts thereacross to effect excitation thereof. Thus, if a grid in only one of the conductor sets 14 and 20 is energized (i.e., by a pulse of approximately 140 volts) the phosphor 13 adjacent to the energized grid will not be illuminated.

With the selection of a vertical grid in the conductor set 12 by two coincident pulses on delay line 18 and simultaneously, the selection of a grid in the horizontal conductor set 14 by two coincident pulses on delay line 19, the potential difference at the crosspoint of the two grids selected is approximately 280 volts—a pulse of 140 volts plus on one grid and 140 volts minus on the other grid— and the phosphor 13 located at the intersection of the two grids thus selected will be excited.

It is apparent from the foregoing description that variation of the values of the input signals applied over horizontal position conductor 22 and vertical position conductor 29 will effect selection of correspondingly different points on the panel. Manifestly the system may therefore be used in the presentation of a raster by successively varying the value of the input signal to the horizontal position conductor 22 at the line frequency rate (i.e., a negative-going sawtooth wave at a frequency of 60 c.p.s.), and simultaneously varying the signal to the vertical position conductor at the frame rate (a negative-going sawtooth wave at a frequency of 120 c.p.s.). The sync circuits 25 are operative at 16 kc.p.s., the sync rate determining the number of grids which can be selected per second. Variation of the value of the delay line bias and the amplitude of the pulses of each pair, or the phosphor bias may be used to achieve variable loads of light backgrounds for the raster.

Modulation of the raster presentation may be effected by coupling alternating current modulation signals over the modulator circuit 200 (FIGURE 6) to effect the presentation of the desired display.

Single point excitation may, of course, be effected by coupling the two signals to the horizontal and vertical position conductors 22, 29 which represent the horizontal and vertical conductors of the point to be energized.

SUMMARY

The novel system described herein comprises a control arrangement which provides reliable selection of a point on an electroluminescent or other light-emitting panel. Horizontal and vertical input signals indicate the coordinates of the point to be selected, and the horizontal and vertical control circuitry provide a pair of pulses to each of the two delay lines to effect intersection on the delay lines at the points of connection of the two grids which intersect at the crosspoint indicated by the input signals. Novel synchronization means insure coincidence of the four pulses at the same time, and of equal import, at the same time after the sync pulse, regardless of the crosspoint on the panel to be selected.

The novel switching circuit including the novel synchronization method and apparatus of the disclosure has utility in other forms of display devices and selection circuits. Thus a storage or switching arrangement comprised of a plurality of storage devices or switching members arranged in a matrix pattern for data storage purposes could be switched in an extremely reliable and efficient manner with such arrangement. Many other applications for the novel switching and synchronization circuits including supervisory control, data processing, telemetering, and the like, will be readily apparent to parties skilled in the art.

While only particular embodiments of the invention have been described and illustrated, it is apparent that modifications and alterations may be made therein. Accordingly it is the intention in the appended claims to cover all such modifications and alterations as may fall within the true spirit and scope of the invention.

What is claimed is:

1. In a display system including a transmission line and light-emitting media disposed to be selectively energized at different positions responsive to coincidence of a pair of pulses at a related position on the transmission line, input means for receiving signals representative of the position on the transmission line to be selected, sync means for providing a sync pulse for each selection of a position on said line, and control circuit means including means connected to said input means operative to provide at least a first and a second output pulse timed to coincide at the represented position on the line at a predetermined period after generation of said sync pulse, said means being operative to effect coincidence at any represented point on the line at the same predetermined period after the sync for said pair of pulses.

2. In a display system including a transmission line and light-emitting media disposed to be selectively energized at different positions responsive to coincidence of at least a pair of pulses at a related position on the transmission line, input means for receiving signals representative of the position on the transmission line to be selected by the coincident pulses, sync means for providing a sync pulse for each selection of a position on said line, and control circuit means including pulse generator means connected to said sync means operative to generate a first and a second output pulse, and means connected to said input means operative to adjust the time of generation of each of the pulses relative to a sync pulse to different values, the time of generation of said first and second pulse after said sync pulse being adjusted to effect coincidence of the pulses at any point on the line at the same predetermined period after generation of the sync pulse for the pair of pulses, and means for coupling said first and second output pulse from said pulse generator means to said line.

3. In a display system including a transmission delay line having circuit taps connected to successive intervals thereon, said taps being disposed to be selectively energized responsive to coincidence of at least a first and second pulse at the related tap on the transmission delay line, input means for receiving signals representative of the tap on the transmission delay line to be selected, sync means for providing a sync pulse for each selection of a tap on said line, and control circuit means operative to provide a first and a second output pulse timed to coincide at any tap on the line at the same predetermined period after generation of their associated sync pulse, and means for coupling said first and said second output pulses to opposite ends of said line.

4. In a display system including a transmission line and light emitting media disposed to be selectively energized at different positions thereon responsive to the coincidence of at least a first and second pulse at a related position on the transmission line, input means for receiving signals representative of the position on the transmission line to be selected, sync means for providing a sync pulse, pulse generator means connected to said sync means for generating at least a first and a second output pulse timed to meet at any position on the line at a predetermined period $tc$ after generation of said sync pulse, circuit means for converting the signals received over said input means to position determining signals for said pulse generator means, said pulse generator means including means controlled by said position determining signals to vary the delay time $td$ after sync for each pulse of a pair to a value to effect said coincidence at said predetermined time period $tc$ after sync, said delay time for at least one pulse of each pair being at least the value of the travel time of the pulse from one end of the line to the middle of said line.

5. In a display system including a transmission line and light emitting media disposed to be selectively energized at different positions thereon responsive to the coincidence of at least a first and second pulse at a related position on the transmission line, input means for receiving signals representative of the position on the transmission line to be selected, sync means providing a sync pulse, and control means connected to said input means and said sync means operative to provide at least a first and a second output pulse timed to meet at any point on the line, the time of coincidence for each pulse being $tc=td+tl$, in which $tc$ is the time of coincidence of the pulse after the sync pulse and is the same value for any point on the line, $tl$ is the time of travel on the line to the point of coincidence, and $td$ is a variable time of delay which is provided between sync and generation of each pulse to maintain $tc$ constant, said delay time for at least one pulse being at least the value of the travel time of the pulse from one end of the line to the middle of said line.

6. In a display system including a transmission line and light emitting media disposed to be selectively energized at different positions thereon by said line responsive to coincidence of at least a pair of pulses on the line at a related position, sync means for providing a sync pulse, control circuit means including means for receiving signals representative of the position on the transmission line to be selected, generator means connected to said sync means for generating a first and a second output pulse means operative responsive to the receipt of signals over said input means representative of one position on the line to provide a first predetermined delay period prior to generation of said one pulse and a second predetermined delay period after sync for the other pulse, said means for providing said delay being controlled by said input signals to provide delay periods prior to the generation of each pulse of a pair which effect the coincidence of any pair of pulses selecting any position on a line at the same period after the sync pulse for the pulse pair, and means for coupling each pulse pair output from said generator means to said line.

7. In a display system including a transmission line and light emitting media disposed to be selectively energizing at different points thereon responsive to energization of a related position on the transmission line by at least a first and a second coincident pulse, sync means for providing a sync pulse, control circuit means including input means for receiving signals representative of the position on the transmission line to be selected, and pulse generator means connected to said sync means for providing a first and a second output pulse timed to meet at the midpoint of the line a predetermined period "tc" after sync after generation of said sync pulse, including means for providing a variable delay period td for each pulse between occurrence of the sync pulse and the time of application of the pulse to the line, which delay period td is of a value to establish coincidence at a predetermined period of time tc for each pulse which is the same for each point on the line, said time tc being comprised of the travel time "tl" on the line to coincidence and said delay period td.

8. In a display system including a transmission line and light emitting media disposed to be selectively energized responsive to coincidence of at least a first and a second pulse at a related position on the transmission line, sync means for providing a sync pulse, control circuit means including input means for receiving signals representative of the position on the transmission line to be selected, pulse generator means controlled by said sync means to provide a first and second pulse, at least, related in time to each sync pulse, and means responsive to a signal from said input means representative of a first point on said line for providing control pulses to said pulse generator means to control same to provide a first and second signal at a predetermined time tdm after sync to effect coincidence at said first predetermined point on said line, said means being responsive to input signals representative of other positions on a line to provide a first signal at a time tdm−xn and a second signal at a time tdm+xn for any other point on said line, in which xn is the time of travel of a pulse from said predetermined point to said other point.

9. In a display system including a first and a second transmission line and light emitting media disposed to be selectively energized at a position thereon responsive to simultaneous coincidence of at least a pair of pulses on said first line and at least a pair of pulses on said second line, sync means for providing a sync pulse for each selection of a position on said line, control circuit means including input means for received signals representative of the position on the display device to be selected, a plurality of pulse generator means connected to said sync means, each of which is operative to generate a pair of said pulses for a different one of said lines, and delay means for adjusting the time of generation of each of said pulses after sync by said pulse generator means to effect coincidence of each pair of pulses at any selected position on its associated line at the same predetermined period after generation of the sync pulse for the pair of pulses, and means for coupling the pulse pair output from each pulse generator means to its associated line.

10. A display system as set forth in claim 7 which includes input means for coupling modulating signals to at least one of said pulse generator means to vary the degree of energization of the light emitting media.

11. In a display system as set forth in claim 7 in which the time of coincidence tc for each pulse at any point on a line is determined by the length of the travel time on the line tl and the delay time td provided by said delay means between the time of generation and the sync pulse, and in which said input means provides signals to said delay means to vary said delay time td to a value for each pulse which maintains the time tc constant for coincidence at any point on the line.

12. In a display system as set forth in claim 7 in which said first and second transmission lines each includes taps along the length thereof, the taps being adjacent the light emitting media in substantially perpendicular relation with each other to provide a plurality of crosspoints, and in which simultaneous coincidence of a pair of pulses adjacent a grid on said first line and a pair of pulses adjacent a grid on said second line effects energization of the crosspoint provided by said two grids and the light emitting media disposed thereat.

13. In a display system including a transmission line and light-emitting media disposed to be selectively energized at different points thereon responsive to coincidence of at least a first and a second pulse at a related position on the transmission line, sync means for providing a sync pulse, control circuit means including phase circuit means for receiving signals representative of the position on the transmission line to be selected, and means in said phase circuit means operative to provide a first and second output signal responsive to receipt of a signal indicating the point to be selected on said transmission line, an electrical characteristic of said output signals being related to the delay time which is to occur prior to generation of each pulse after said sync pulse, and pulse generator means connected to said sync means controlled by said sync pulse and said signals to generate a first and a second output pulse at the times indicated by said output signals to select the indicated point at a predetermined time after sync, including delay means controlled by said output signals of said phase circuit means to provide a delay in the time of generation of each pulse of a pair of output pulses after sync of a value to effect coincidence at the same predetermined period after the sync pulse in the selection of any position on said line.

14. In a display system including a transmission line and light-emitting media disposed to be selectively energized at different positions responsive to selective coincidence of at least two pulses at a related position on said transmission line, phase circuit means including input means for receiving signals representative of the position on the transmission line to be selected, and means in said phase circuit means operative to simultaneously provide a first and a second output signal responsive to receipt of a signal indicating the position to be selected on said transmission line, an electrical characteristic of said first output signal determining the travel time of said first pulse on the transmission line, and an electrical characteristic of said second output signal determining the travel time of said second pulse on the transmission line including means for varying the value of said electrical characteristic of said first and second output signals with the value of said input signal and inversely with each other.

15. In a display system including a transmission line and light-emitting media disposed to be selectively energized at different positions responsive to selective coincidence of at least two pulses at a related position on said transmission line, phase circuit means including an oscillator circuit for providing output signals of a predetermined amplitude, input means for receiving signals representative of the position on the transmission line to be selected, gate means including an output circuit, and means controlled by said received signals to vary the amplitude of the signals provided from said oscillator prior to coupling to said output circuit, and derivation means in said phase means operative to simultaneously derive a first and a second output signal from each of said output signals which have a complementary time base and which vary simultaneously in a predetermined electrical characteristic, the electrical characteristic of the first signal being of a value to determine the travel time of said one pulse on the transmission line, and the electrical characteristic of the second signal being of a value to determine the travel time of said second pulse on the transmission line, the electrical characteristics being varied with each other to correspondingly vary the position of coincidence on said line, pulse generator means for generating a first and second position-selecting pulse in response to said first and second signals, and means for coupling said position selecting pulses to said line.

16. In a display system including a transmission line and light-emitting media disposed to be selectively energized at different positions responsive to selective coincidence of at least two pulses at a related position on said transmission line, phase circuit means including pulse producing circuit means for providing output signals of a predetermined amplitude in a cyclic manner, input means for receiving position representative signals representative of the position on the transmission line to be selected, gate means connected to said pulse producing circuit means and said input means controlled by said position representative signals to modify an electrical characteristic of the signals provided by said pulse producing circuit means in accordance with the value of said position representative signals, output means for said gate means, derivation means connected to the output circuit of said gate means operative to simultaneously derive a first and a second output signal from each of said modified output signals, a first and a second pulse generator means for generating a first and a second output pulse, and timing means for each pulse generator circuit responsive to said first and second signals to delay the time of generation of said first and second output pulses for a time proportional to the value of said first and second signals.

17. A display system as set forth in claim 16 in which said derivation means comprises a first and a second rectifier connected to said output circuit in opposite polarity conducting relation, and a first circuit for deriving the first output signal from said first rectifier and a second circuit for deriving the second output signal from said second rectifier.

18. A display system as set forth in claim 16 in which said input means includes means for coupling alternating current modulating signals to said gate means to modulate the signals coupled over said output circuit.

19. In a display system including a transmission line and light-emitting media disposed to be selectively energized at different positions responsive to a predetermined energization of a related position on the transmission line, input means for receiving signals representative of the position on the transmission line to be selected, sync means for providing a sync pulse, and control circuit means including a first and a second pulse generator connected to said sync means operative to provide at least a first and a second output pulse timed to coincide at any point on the line at the same predetermined period after generation of said sync pulse, at least one of said pulse generator circuits including pulse means operative to initiate generation of a timing pulse responsive to receipt of each sync pulse, timing means connected to said input means operative to terminate generation of the timing pulse after a time period related to the value of the signal received over said input means, and pulse means for coupling an output pulse to said line responsive to termination of said timing pulse.

20. A system as set forth in claim 19 in which said timing means includes a potential storage means, a first charging circuit for said potential storage means including means for controlling said first charging circuit to charge said storage means to a first value related to the input signal, and a second charging circuit controlled with operation of said pulse means to charge the storage means to a fixed predetermined value, and means controlled by said storage means to terminate generation of said timing pulse by said pulse means responsive to charging of said storage means to said predetermined value.

21. In a display system including a transmission line having a plurality of circuits, each of which is disposed to be selectively energized responsive to coincidence of at least a pair of pulses at a related position on the line, sync means for providing a sync pulse, control circuit means including input means for receiving signals representative of the position on the transmission line to be selected, and means operative responsive to receipt of signals representative of one position on the line to generate a first and a second output pulse at a predetermined period after generation of said sync pulse to select said one position on the line, and operative responsive to the receipt of signals over said input means representative of other positions on the line to reduce said predetermined period for said one pulse and to increase said predetermined period by a like amount for the other pulse, whereby the coincidence of any pair of pulses always occurs at the same period after a sync pulse.

22. In a display system including a first and second transmission line, and a plurality of circuit means for each line, each of which is disposed to be selectively energized responsive to simultaneous coincidence of at least a pair of pulses at a related position on its associated line, functional means operative responsive to simultaneous energization of one circuit means on each of said lines, sync means for providing a sync pulse for each selection of a position on said line, control circuit means including input means for receiving signals representative of the different circuit means on each of said lines to be selected, generator means connected to said sync means operative to generate the pulse pairs for selecting the circuit means on each of said lines represented by said signals on said input means, and means for controlling the time of generating at least one pulse of each pair relating to sync by said generator means to control coincidence of each pair of pulses on the two lines at any position selected on said line at the same predetermined period after generation of said sync pulse.

23. A system as set forth in claim 16 in which one of said timing means comprises potential storage means, a first charging circuit for said potential storage means including means for controlling said first charging circuit to charge said storage means to a first value related to the input signal and a second charging circuit controlled with operation of said pulse means to charge the storage means to a fixed predetermined value, and means controlled by said storage means to terminate generation of said timing pulse by said pulse means responsive to charging of said storage means to said predetermined value.

References Cited by the Examiner

UNITED STATES PATENTS 2,955,231  10/1960  Aiken _____________ 313—108.1

OTHER REFERENCES

Talesnick and Yando: "A Solid State Oscilloscope Display," Procedings of the I.R.E., July 1961.

DAVID G. REDINBAUGH, *Primary Examiner.*

J. A. O'BRIEN, J. McHUGH, *Assistant Examiners.*